April 11, 1961   P. E. SEIFRIED ET AL   2,979,707
ELECTRICAL FAULT WARNING DEVICE
Filed Sept. 22, 1958

INVENTORS
PAUL E. SEIFRIED
FRED W. MEYER JR.
BY *Herbert L. Davis*
ATTORNEY

United States Patent Office

2,979,707
Patented Apr. 11, 1961

2,979,707

ELECTRICAL FAULT WARNING DEVICE

Paul E. Seifried, New City, N.Y., and Fred W. Meyer, Jr., Clifton, N.J., assignors to The Bendix Corporation, a corporation of Delaware Filed Sept. 22, 1958, Ser. No. 762,614

2 Claims. (Cl. 340—253)

The invention relates to indicating devices for electrical apparatus and more particularly to a device for indicating a failure in the supply of electrical energy to an electric motor for driving a gyro rotor and to improvements in a fault warning device of a type such as disclosed and claimed in U.S. Patent No. 2,664,558, granted December 29, 1953 to Henry Konet and Paul E. Seifried and assigned to Bendix Aviation Corporation, so as to provide an electrical fault warning device in an electrically operated indicator for detecting both current interruption and low voltage in the supply of electrical energy thereto.

In the use of electric gyro motors in an indicator of the type disclosed in the U.S. Patent No. 2,664,558, it has been found necessary to know both when the gyro motor is receiving power (current) and when it has the proper voltage applied at the receptacle of the instrument. When the gyro is not receiving current the motor will not run at all and when the voltage applied is too low the motor will run at a slower speed thus making the gyro less reliable and also subject to excessive precision errors.

An object of the invention, therefore, is to provide a power failure system which will detect both current interruption and low voltage.

Another object of the invention is to provide means to effect immediate signalling to the operator of an aircraft of a power interruption or partial power failure with respect to either current or supply voltage for operation of a gyro motor of a flight condition indicator.

Another object of the invention is to provide a novel power failure indicating means for use in a remote electrical attitude indicating device of an aircraft.

The invention contemplates providing a two-phase indicator torque motor having two windings, the energization of both windings of which are sensitive to the current flow while one of the windings may be shunted by a relay sensitive to the voltage condition of the supply system. The torque motor is suitably connected to a warning device visible to the operator of the craft at the indicator so that upon an interruption or a partial failure in either the current or voltage of the electrical energy supplied through any one of the supply lines for the system, the warning device is brought into view. During normal uninterrupted operation of the supply lines, the warning device is held out of view by the operation of the torque motor in response to the torque motor sensed operating condition of the energizing current and the relay sensed condition of the voltage of the supply system.

The foregoing and other objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration and description, and are not to be construed as defining the limits of the invention.

Figure 1:
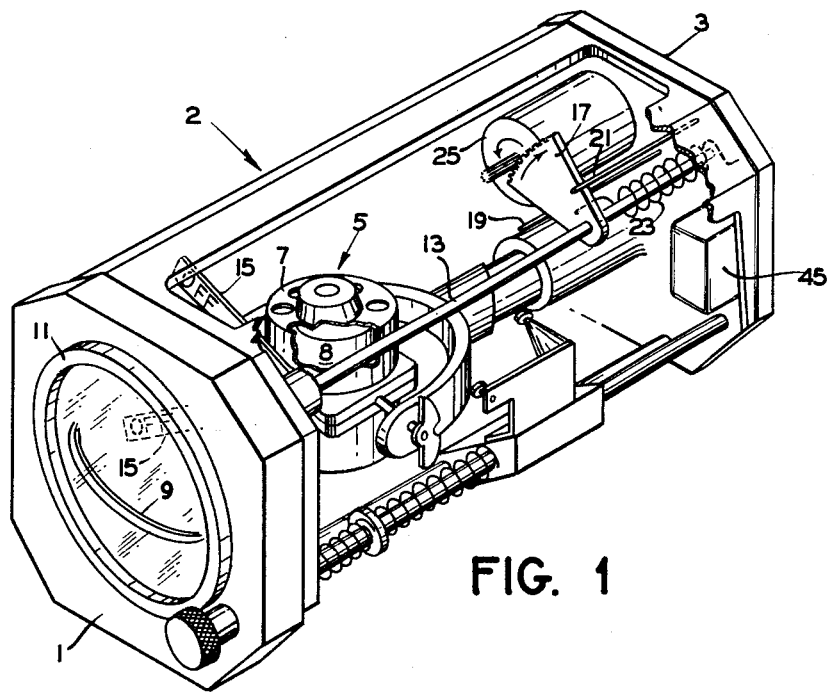
Figure 1 is a perspective view of a typical power failure indicator in which the invention may be embodied and including a gyro horizon indicator having a motor for driving the rotor.

Referring now to the drawings for a more detailed description of the novel power failure indicator system of the present invention, the power failure indicator is shown in Figure 1 as incorporated in a gyro horizon indicator which may be generally of a type such as disclosed in U.S. Patent No. 2,664,558, having a housing 2 with a front wall 1 and a rear wall 3. A gyro vertical 5 having a motor 7 for driving a rotor 8 is mounted within the housing. A horizon indicator bar 9 is visible through a window 11 in wall 1 and is controlled by the gyro vertical and indicates the attitude of the craft in which the gyro horizon indicator is mounted.

An elongated shaft 13 is rotatably supported by walls 1 and 3 and mounts a flag 15 movable between an "off" position shown in dot-dash lines in Figure 1, in which the flag is visible through window 11, and an "on" position shown in solid lines, in which the flag is hidden from view behind the front wall. A sector gear 17 is fixed to shaft 13 and engages stops 19, 21 fixed to rear wall 3 to limit rotation of shaft 13 to an angle of approximately thirty (30°) degrees. A spring 23 encircling shaft 13, has one end attached to rear wall 3 and its other end attached to sector gear 17 and yieldingly urges sector gear 17 into engagement with stop 19. A two-phase torque motor 25 is secured to rear wall 3, and when energized, drives sector gear 17 into engagement with stop 21.

Figure 2:
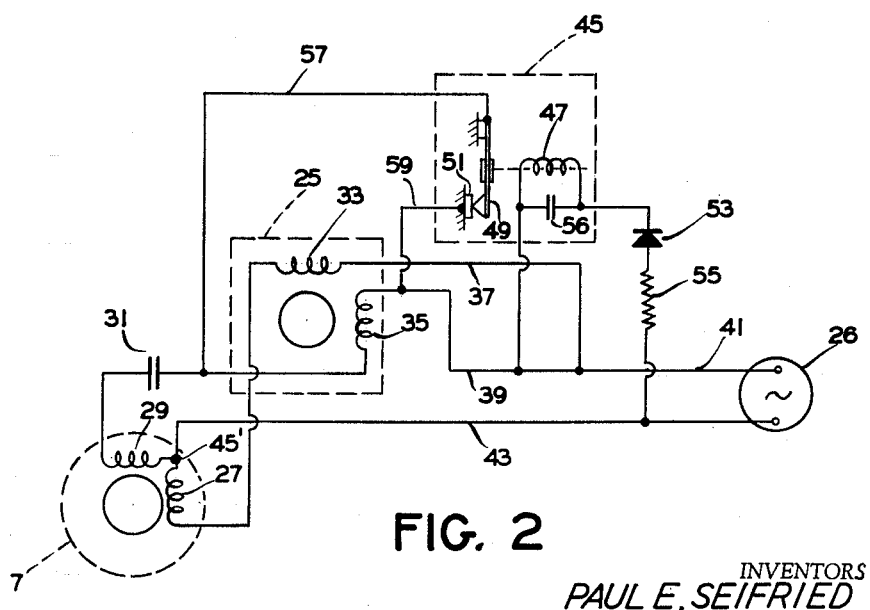
Figure 2 is a schematic wiring diagram showing the electrical connections for the novel system of the present invention.

As shown in Figure 2, the invention may be applied to an indicator having a gyro motor 7 of a split phase hysteresis type energized from a single phase source of alternating current 26, such as, for example, 115 volt 400 cycle power. A fixed phase winding 27 of the stator of the gyro motor 7 is connected across the source of power 26. A split phase winding 29 of the stator of the gyro motor 7 is connected in series with a condenser 31 and in parallel with the fixed phase winding 27. The condenser 31 displaces the current in the split phase winding 29 causing it to lead that in the fixed phase winding 27. The motor 7 then senses the energizing current for the two windings 27 and 29 as two separate phases approximately ninety (90°) degrees apart.

In series with the respective windings 27 and 29 and mounted within the instrument housing 2 are two windings 33 and 35 of a two-phase torque motor 25. The windings 33 and 35 are connected by conductors 37 and 39 to an output conductor 41 leading from the source of alternating current 26. An opposite output conductor 43 leads from the source of alternating current 26 to a point 45' connecting the windings 27 and 29 of the motor 7. When alternating current of sufficient amounts flows from the source 26 and through the respective conductors 41, 37, 39 and 43 to the gyro motor 7 and thereby through the torque motor 25, the torque motor 25 turns sector gear 17 and thereby shaft 13 to cause an "off" flag 15 to disappear from view through the window 11 indicating correct operation. If there is a current interruption in the supply lines 41, 37, 39 and 43 or in the aforedescribed series—parallel circuit, the torque motor 25 will lose torque, and a spring 23 loaded by the torque motor 25 will cause the "off" flag 15 to move into view through window 11 indicating a power failure.

Mounted within the housing 2 is a voltage sensitive relay 45 shown generally in Figure 1 and indicated diagrammatically in Figure 2 as having an electromagnetic winding 47 connected across the output lines 41 and 43 from the source of alternating current 26 and in parallel with the windings of the two motors 7 and 25. The electromagnetic winding 47 is arranged to actuate a switch arm 49 to a position opening a contact 51 when the voltage across the output conductors 41 and 43 exceeds a predetermined value. The switch arm 49 is biased under spring tension so as to close contact 51 when such voltage falls a certain value below the predetermined "open" value. The energizing circuit for the electromagnetic winding 47 includes a rectifier 53 and a current limiting resistor 55. A filter capacitor 56 is connected in parallel with the electromagnetic winding 47.

The switch arm 49 and cooperating contact 51 are connected in parallel by conductors 57 and 59 to one of the windings 35 of the two phase torque motor 25 and the arrangement is such that when a low voltage condition exists across the energizing lines to the gyro motor 7, the contact 49 and arm 51 of the relay 45 will be closed so as to shunt out one of the phase windings 35 of the torque motor 25. This causes the torque motor 25 to have no effective torque whereupon the "off" flag 15 is biased by spring 23 to a position visible through the window 11 indicating a faulty power supply to the motor 7 of the gyro indicating instrument under such low voltage conditions. When the voltage across the lines 41 and 43 to the gyro motor 7 is above a predetermined value the relay 45 will actuate the switch arm 49 and open the cooperating contact 51 so as to remove the shunt across the winding 35 of the torque motor 25, whereupon the torque motor may bias the "off" flag 15 from view through the window 11 indicating adequate line voltage to the gyro motor 7.

In the system of the invention, the power failure device will detect both loss of current as well as voltage. Moreover, in the event that low voltage exists and the flag 15 shows an "off" condition the gyro will not be disabled; that is, the gyro motor 7 is permitted to run as long as there is sufficient voltage across the lines 41 and 43 to operate the gyro motor 7.

The invention may be applied to a multi-phase system as well as to a single or two phase system. In the case of a multi-phase system instead of a single voltage sensitive relay, there may be utilized voltage sensitive relays similar to relay 45 connected across the respective phases and arranged so as to shunt under a low voltage condition a winding of the torque motor 25.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a device for indicating a fault in an electrical system of a type including apparatus having input connections adapted to be energized by an alternating current source, a torque motor having phase windings connected in series with at least two of the input connections of the apparatus, a warning indicator driven from one position to another position by said motor when current flows normally in the system, and means to bias the warning device in an opposite sense upon the current supplied the system decreasing below a predetermined minimum value; the improvement comprising an electromagnetic winding sensitive to voltage applied across input connections to the apparatus, switch means biased to a position to close a shunt circuit across one of the windings of the torque motor so as to render the torque motor ineffective to drive the warning indicator, and said electromagnetic winding operative to actuate said switch means to another position to open the shunt circuit upon the sensed voltage exceeding a predetermined value, whereupon the opening of the shunt circuit renders the torque motor effective to drive the warning indicator to said other position upon a normal current flow in the system.

2. In a device for indicating a fault in an electrical system of a type including apparatus having input connections adapted to be energized by an alternating current source, torque motor having phase windings connected in series with at least two of the input connections of the apparatus, a warning indicator driven from one position to another position by said motor when current flows normally in the system, and means to bias the warning device in an opposite sense upon the current supplied the system decreasing below a predetermined minimum value; the improvement comprising relay means sensitive to voltage applied across input connections to the apparatus, said relay means including control means effective in one sense to render the torque motor inoperative upon the voltage sensed by the relay means decreasing below a predetermined value, and said control means effective in another sense to render the torque motor operative upon the voltage sensed by the relay means exceeding a predetermined value.

References Cited in the file of this patent

UNITED STATES PATENTS

| | | |
|---|---|---|
| 2,664,558 | Konet | Dec. 29, 1953 |
| 2,880,618 | Jessup | Apr. 7, 1959 |